US012737514B2

(12) United States Patent
Zhang et al.

(10) Patent No.: US 12,737,514 B2
(45) Date of Patent: Sep. 15, 2026

(54) RISK ASSESSMENT METHOD OF WATER INRUSH IN TUNNELS CONSTRUCTED IN WATER-RICH GROUNDS

(71) Applicant: Qingdao University of Technology, Qingdao City (CN)

(72) Inventors: Yongjun Zhang, Qingdao City (CN); Fei Liu, Qingdao City (CN); Huangshuai Xia, Qingdao City (CN); Bin Gong, Qingdao City (CN); Sijia Liu, Qingdao City (CN); Yingming Wu, Qingdao City (CN); Qingsong Wang, Qingdao City (CN); Hongzhi Liu, Qingdao City (CN); Ruiquan Lu, Qingdao City (CN); Mingdong Yan, Qingdao City (CN); Lijun Zhang, Qingdao City (CN); Xiaoming Guan, Qingdao City (CN); Pingan Wang, Qingdao City (CN); Shuguang Li, Qingdao City (CN); Dengfeng Yang, Qingdao City (CN); Weiguo Zhang, Qingdao City (CN)

(73) Assignee: Qingdao University of Technology, Qingdao (CN)

( * ) Notice: Subject to any disclaimer, the term of this patent is extended or adjusted under 35 U.S.C. 154(b) by 795 days.

(21) Appl. No.: 18/172,082

(22) Filed: Feb. 21, 2023

(65) Prior Publication Data

US 2024/0135069 A1 Apr. 25, 2024

(30) Foreign Application Priority Data

Sep. 30, 2022 (CN) ......................... 202211212683.8

(51) Int. Cl.
*G06F 30/23* (2020.01)
*G01V 20/00* (2024.01)
(Continued)

(52) U.S. Cl.
CPC .............. *G06F 30/23* (2020.01); *G01V 20/00* (2024.01); *G06F 2111/10* (2020.01); *G06F 2113/08* (2020.01)

(58) Field of Classification Search
CPC .. G06F 30/23; G06F 2111/10; G06F 2113/08; G01V 20/00; G06Q 50/08; G06Q 10/0635; G05B 17/02
See application file for complete search history.

(56) References Cited

U.S. PATENT DOCUMENTS 10,151,856 B1 * 12/2018 Copeland ................ G06F 30/23
2013/0118736 A1 * 5/2013 Usadi ...................... G06F 30/23
166/268

(Continued)

FOREIGN PATENT DOCUMENTS

WO WO-2014166244 A1 * 10/2014 ............. G06F 30/20

*Primary Examiner* — Brian W Wathen
(74) *Attorney, Agent, or Firm* — Venable LLP

(57) ABSTRACT

The present disclosure provides a risk assessment method of water inrush in tunnels constructed in water-rich grounds. The method includes the following steps: simulating a tunnel excavation process by finite element software MIDAS GTS NX and fluid-structure interaction; according to a research method of control variables, analyzing effects of a groundwater level, an elastic modulus and advanced pipe shed grouting on the stability of surrounding rock, and improving an algorithm of a radial basis function (RBF) neural network using a Grey Relation Analysis (GRA)-based Partitioning Around Medoid (PAM) clustering algorithm to assess risks of water inrush occurring in Qingdao area.

8 Claims, 3 Drawing Sheets

Simulate a tunnel excavation process by finite element software MIDAS GTS NX and fluid-structure interaction

↓

According to a research method of control variables, analyze effects of a groundwater level, an elastic modulus and advanced pipe shed grouting on the stability of surrounding rock

↓

Improve an algorithm of an RBF neural network using a GRA-based PAM clustering algorithm to assess risks of water inrush occurring in Qingdao area

(51) Int. Cl.
*G06F 111/10* (2020.01)
*G06F 113/08* (2020.01)

(56) References Cited

U.S. PATENT DOCUMENTS

| | | | | |
|---|---|---|---|---|
| 2021/0164348 | A1* | 6/2021 | Kim | E21F 17/18 |
| 2022/0284152 | A1* | 9/2022 | Li | G06F 30/18 |
| 2022/0318462 | A1* | 10/2022 | Li | E02D 1/027 |
| 2022/0334035 | A1* | 10/2022 | Li | G01N 29/07 |
| 2023/0384470 | A1* | 11/2023 | Jiang | G01V 1/282 |

* cited by examiner

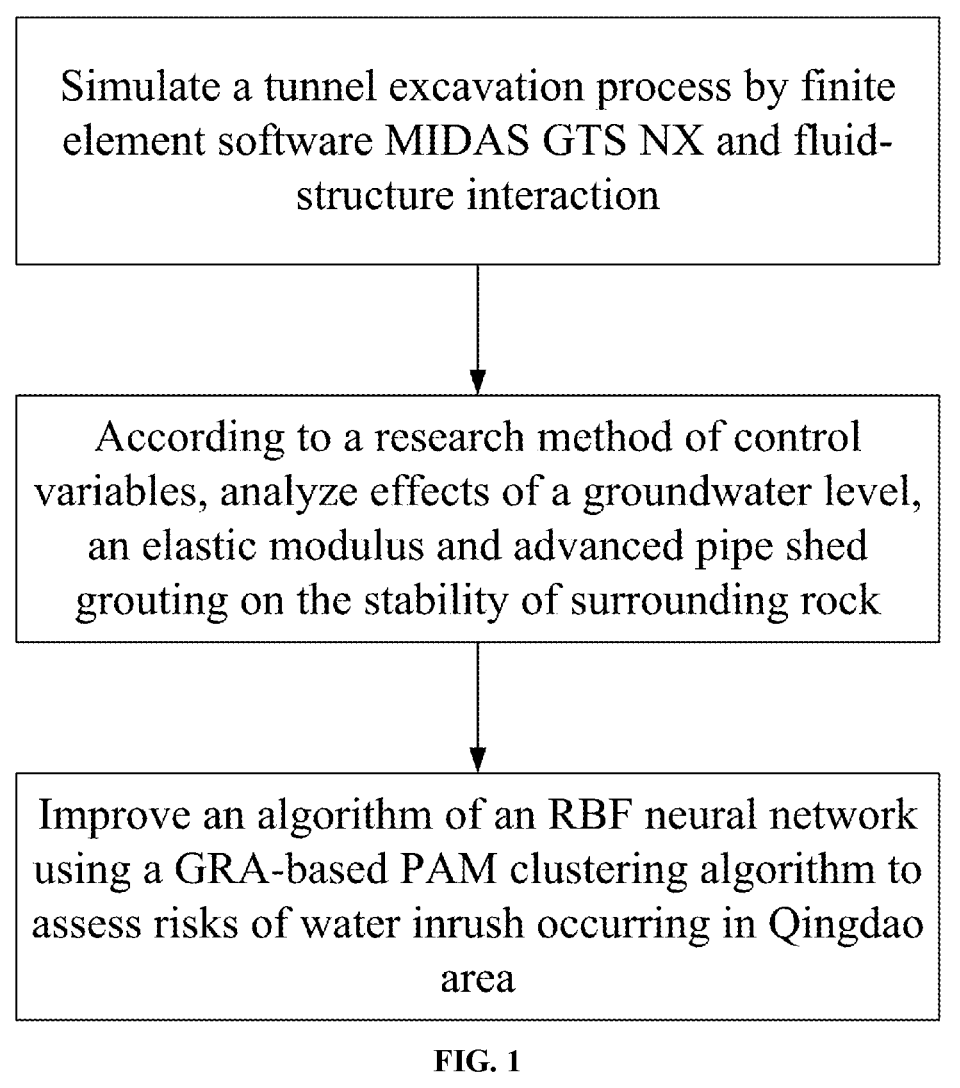

Simulate a tunnel excavation process by finite element software MIDAS GTS NX and fluid-structure interaction According to a research method of control variables, analyze effects of a groundwater level, an elastic modulus and advanced pipe shed grouting on the stability of surrounding rock Improve an algorithm of an RBF neural network using a GRA-based PAM clustering algorithm to assess risks of water inrush occurring in Qingdao area

FIG. 1

RISK ASSESSMENT METHOD OF WATER INRUSH IN TUNNELS CONSTRUCTED IN WATER-RICH GROUNDS

CROSS REFERENCE TO RELATED APPLICATION

This patent application claims the benefit and priority of Chinese Patent Application No. 202211212683.8, filed with the China National Intellectual Property Administration on Sep. 30, 2022, the disclosure of which is incorporated by reference herein in its entirety as part of the present application.

TECHNICAL FIELD

The present disclosure relates to the technical field of tunnel construction, and in particular to a risk assessment method of water inrush in tunnels constructed in water-rich grounds.

BACKGROUND

During tunnel construction, there are many engineering accidents caused by natural factors, among which tunnel collapses and water inrush occur frequently, which results in huge economic losses and potential losses. Tunnel construction in offshore areas often encounters unfavorable geology such as water-rich sand layer, water-rich fault, and quaternary strata. After excavation in such a geological condition, surrounding rock often gets poor in stability, inclination and large deformation often occur, and even landslides and other accidents occur may take place, making the construction all the more difficult. In addition, seepage force of water further complicates the physical and mechanical properties of surrounding rock, which often induces quicksand, water inrush, mud inrush and other serious geological disasters, resulting in a sudden drop of groundwater level, large-scale ground subsidence, and even serious environmental issues.

With the rapid development of coastal economy and bay area economy in China, the transportation industry is rapidly advancing. The development demand of national marine strategy and urban development has driven a growing number of offshore tunnel projects, and more and more attention has been paid to the risk assessment of tunnel engineering.

In most cases, drainage is often conducted to address groundwater problems encountered in tunnel construction. This method, however, may easily cause serious engineering disasters such as ground surface subsidence and ground surface collapse; moreover, it may induce formation of a water seepage passageway and reduced stability of the surrounding rock. In addition, "full plugging" is costly, as the influence of a water head needs to be considered in the process of tunnel design, plus the fact that it is all but impossible to avoid drop of the underground water head, and water seepage in the lining structure in the actual project. At present, there are few studies around the world on the complex stratum and its water-rich characteristics in an offshore area, the mechanism and assessment methods of tunnel water inrush and corresponding engineering solutions. Besides, existing analysis methods for water inrush during tunnel construction are not accurate enough to help prevent and treat water inrush in tunnel construction, resulting in the failure to ensure the safety of offshore tunnel construction. In view of this, the present disclosure provides a risk assessment method of water inrush in tunnels constructed in water-rich grounds, so as to solve the problems existing in the prior art.

SUMMARY

In view of the foregoing problems, an objective of the present disclosure is to provide a risk assessment method of water inrush in tunnels constructed in water-rich grounds, so as to solve the problems that existing analysis methods for water inrush during tunnel construction are not accurate enough to help prevent and treat water inrush in tunnel construction, resulting in the failure to ensure the safety of offshore tunnel construction.

In order to achieve the above objective, the present disclosure is implemented through the following technical solution: a risk assessment method of water inrush in tunnels constructed in water-rich grounds is provided, where the method includes the following steps:

- step 1: first, simulating a tunnel excavation process by finite element software MIDAS GTS NX and fluid-structure interaction, building a three-dimensional model of tunnel construction according to field construction data, then analyzing precursory information and stress-displacement response of a water inrush accident occurring in subway tunnel construction according to the three-dimensional model of tunnel construction, and determining causes of the water inrush accident occurring in a fracture zone of a water-rich ground according to analysis results;
- step 2: according to a research method of control variables, creating a tunnel construction model under different working conditions by the finite element software, qualitatively and quantitatively analyzing effects of factors of a groundwater level, an elastic modulus of a fracture zone and advanced pipe shed grouting on the stability of surrounding rock, and summarizing change rules of deformation and seepage of the surrounding rock under different working conditions; and
- step 3: based on the field construction data, acquiring physical and mechanical indexes of soil and rock of a complex stratum in an offshore area and engineering characteristics under a condition of rich water, summarizing water yield properties of various kinds of complex strata, improving an algorithm of a radial basis function (RBF) neural network using a Grey Relation Analysis (GRA)-based Partitioning Around Medoid (PAM) clustering algorithm to assess risks of collapse and water inrush occurring in the stratum, building a water yield property assessment model according to the causes of the water inrush accident and the change rules of deformation and seepage of the surrounding rock under different working conditions, extracting a training sample and a test sample from actual tunnel engineering, training the built neural network model, and assessing the risks of water inrush in tunnel construction.

As a further improvement of the present disclosure, said building a three-dimensional model in step 1 specifically includes: on the basis of the finite element software MIDAS GTS NX, and in combination with fluid-structure interaction, analyzing a water inrush accident occurring in an offshore water-rich area to be assessed to obtain a mechanism of a water inrush accident during tunnel construction in a complex stratum of an offshore area, and analyzing an evolution process of a water inrush accident from the aspects of hydroengineering geology, displacement fields, stress fields and seepage fields.

As a further improvement of the present disclosure, said GRA in step 3 specifically includes:

A1: defining a risk assessment grade as a reference sequence that reflects characteristics of a system, and a risk assessment index as a comparison sequence that affects the system, and analyzing m groups of reference sequences and n groups of comparison sequences from measured data of a water inrush volume to build an original data matrix as follows:

$$[X]=\begin{bmatrix} x_{10} & \cdots & x_{1n} \\ \vdots & \ddots & \vdots \\ x_{m0} & \cdots & x_{mn} \end{bmatrix}$$

where in this matrix, the first column denotes a reference sequence, and the second column denotes a comparison sequence;

A2: conducting dimensionless processing on original data using an initial value method, where processed data are as follows:

$X'=x_{ij}/x_{i1}$ where i=1, 2 . . . m, j=0, 1 . . . n;

A3: calculating a correlation coefficient as follows:

$$\xi_{ij}=\frac{\min\{|X'_{ij}-X'_{io}|\}+\rho\max\{|X'_{ij}-X'_{io}|\}}{|X'_{ij}-X'_{io}|+\rho\max\{|X'_{ij}-X'_{io}|\}}$$

where $\xi_{ij}$ denotes a correlation coefficient between an ith parameter of a jth comparison sequence and an ith parameter of a reference sequence, $\rho$ denotes an identification coefficient with a value range of [0, 1], a smaller value of the identification coefficient indicates a more significant difference between the correlation coefficients, and according to the actual engineering background and grey theory, setting $\rho$=0.5; and A4: averaging correlation coefficient sequences, and taking an obtained average value as a correlation degree which is expressed as follows:

$$\gamma_{0i}=\frac{1}{n}\sum_{i+1}^{n}\xi_{ij}$$

where $\gamma_{0i}$ denotes a correlation degree, and the closer the $\gamma_{0i}$ is to 1, the higher the correlation degree is.

As a further improvement of the present disclosure, in step 3, the RBF neural network includes an input layer, a hidden layer and an output layer, the RBF neural network forms a space of the hidden layer with data of the input layer by using a radial basis function as a mapping relationship, and data of the hidden layer is high-dimensional and linearly separable, and is subject to weight adjustment to linearly obtain data of the output layer.

As a further improvement of the present disclosure, in step 3, a Gaussian function is adopted as an activation function of the RBF neural network:

$$\varphi(X_m, X_i)=\exp\left(-\frac{1}{2\sigma_i^2}\|X_m-X_i\|^2\right)$$

where $X_i$ denotes a clustering center point, $\|X_m-X_i\|$ denotes a Euclidean distance between a sample point of an input space and the clustering center point, $\sigma_i$ denotes an expansion constant of a radial basis function, and when $$d_i=\max_m\|X_m-X_i\|,$$

the expansion constant is $\sigma_i=d_i/\sqrt{2k}$, in which k is a number of center points.

As a further improvement of the present disclosure, said improving an algorithm of an RBF neural network using a GRA-based PAM clustering algorithm in step 3 specifically includes:

B1: determining an original data analysis sequence, and constructing an original matrix for dimensionless processing;

B2: calculating a correlation degree r between a comparison sequence and a reference sequence;

B3: determining an input vector X, an actual output vector Y and a target output vector Z of the neural network based on the correlation degree;

B4: determining a number k of clusters, conducting iteration 600 times using a standardized Euclidean distance to determine a clustering center matrix that meets the RBF neural network;

B5: determining a center c of the neural network and an expansion constant $\sigma_i$, initializing a weight vector W, and substituting into a Gaussian function to determine an implicit function output;

B6: training the neural network using a gradient descent method, setting an upper limit of an error to 0.005, and an upper limit of iteration times to 10,000, and constantly updating the weight vector and standard deviation until convergence; and B7: rating test data using a trained neural network, and comparing a prediction result with the RBF neural network and a back propagation (BP) neural network.

As a further improvement of the present disclosure, in B2, the correlation degree r between the comparison sequence and the reference sequence is within a range of 0-1, and the closer it is to 1, the greater the correlation degree is.

As a further improvement of the present disclosure, in B7, the algorithm of the RBF neural network is improved using GRA-based PAM to train and predict sample data, a water inrush risk assessment model is programmed, assessment data is compared with actual data and prediction data from the traditional RBF neural network and BP neural network, so as to verify the accuracy and reliability of the model.

The present disclosure has the following beneficial effects: mechanism analysis is carried out through the finite element software MIDAS GTS NX in combination with fluid-structure interaction, and an assessment model of the improved RBF neural network based on GAR-based PAM can reflect risk factors of water inrush with the greatest influence; meanwhile, the present disclosure can effectively reduce the sample dimension, can achieve denoising and reduce the difficulty of iterative operation while maintaining the original structure of data, avoid the problems that a traditional model needs to be adjusted manually and has slow iterative speed through PAM clustering and gradient descent method, and improve the risk prevention ability of tunnel or underground engineering professionals, thereby contributing to the prevention and treatment of water inrush occurring in Qingdao subway tunnel construction.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show some embodiments of the present disclosure, and a person of ordinary skill in the art may still derive other drawings from these accompanying drawings without creative efforts.

FIG. 1 is a flowchart of a method according to the present disclosure;

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Embodiment 1

Figure 2:
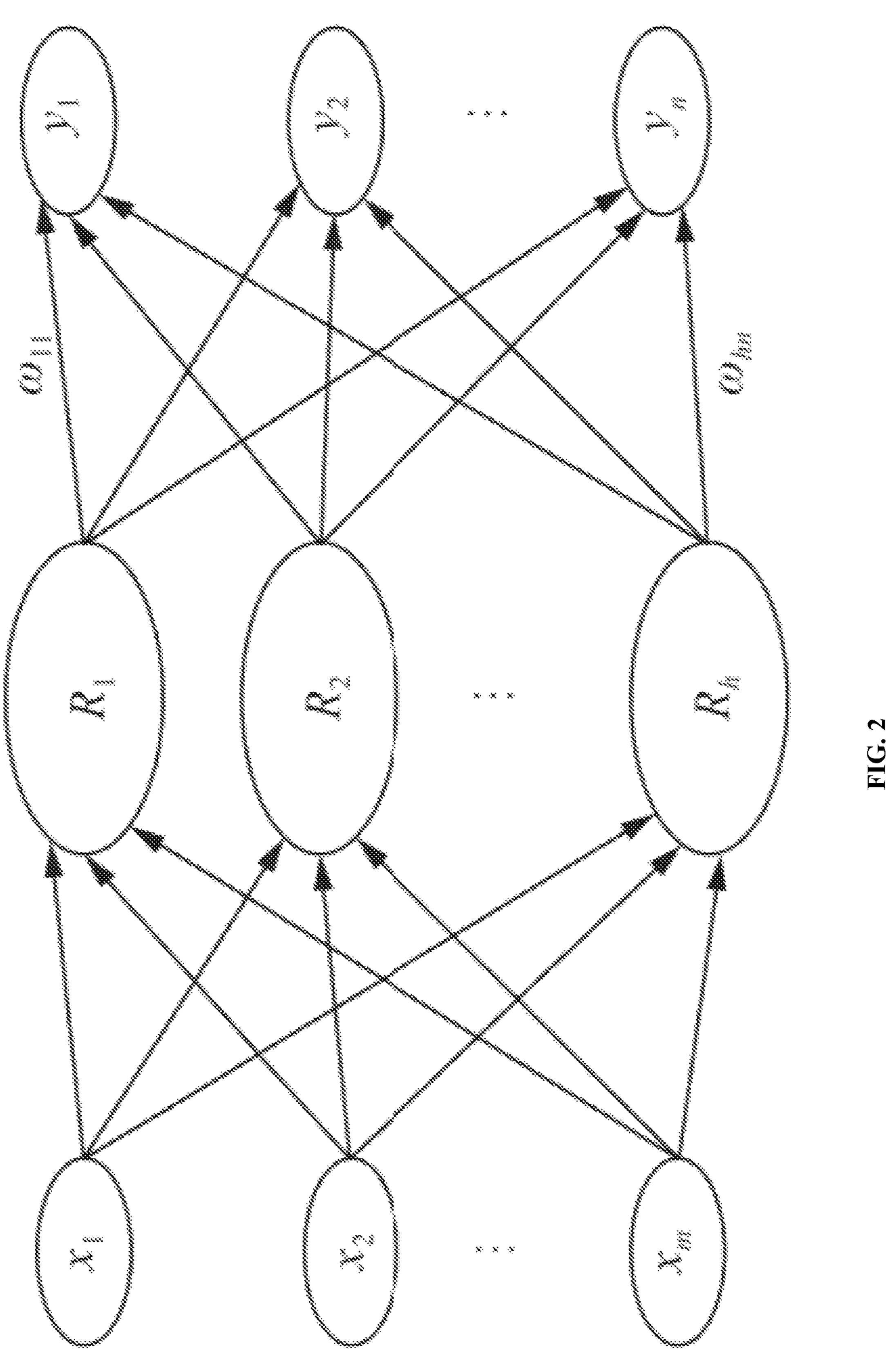
FIG. 2 is a structure diagram of an RBF neural network according to Embodiment 1 of the present disclosure.

As shown in FIG. 1 and FIG. 2, this embodiment provides a risk assessment method of water inrush in tunnels constructed in water-rich grounds, the method including the following steps:

Step 1: first, simulate a tunnel excavation process by finite element software MIDAS GTS NX and fluid-structure interaction, build a three-dimensional model of tunnel construction according to field construction data, then analyze precursory information and stress-displacement response of a water inrush accident occurring in subway tunnel construction according to the three-dimensional model of tunnel construction, and determine causes of the water inrush accident occurring in a fracture zone of a water-rich ground according to analysis results;

when the three-dimensional model is built, on the basis of the finite element software MIDAS GTS NX, and in combination with fluid-structure interaction, analyze a water inrush accident occurring in an offshore water-rich area to be assessed to obtain a mechanism of a water inrush accident during tunnel construction in a complex stratum of an offshore area, and analyze an evolution process of a water inrush accident from the aspects of hydroengineering geology, displacement fields, stress fields and seepage fields;

step 2: according to a research method of control variables, creating a tunnel construction model under different working conditions by the finite element software, qualitatively and quantitatively analyzing effects of factors of a groundwater level, an elastic modulus of a fracture zone and advanced pipe shed grouting on the stability of surrounding rock, and summarizing change rules of deformation and seepage of the surrounding rock under different working conditions; and step 3: based on the field construction data, acquire physical and mechanical indexes of soil and rock of a complex stratum in an offshore area and engineering characteristics under a condition of rich water, summarize water yield properties of various kinds of complex strata, improve an algorithm of a radial basis function (RBF) neural network using a Grey Relation Analysis (GRA)-based Partitioning Around Medoid (PAM) clustering algorithm to assess risks of collapse and water inrush occurring in the stratum, build a water yield property assessment model according to the causes of the water inrush accident and the change rules of deformation and seepage of the surrounding rock under different working conditions, extract a training sample and a test sample from actual tunnel engineering, train the built neural network model, and assess the risks of water inrush in tunnel construction, where said GRA in step 3 specifically includes:

A1: define a risk assessment grade as a reference sequence that reflects characteristics of a system, and a risk assessment index as a comparison sequence that affects the system, and analyze m groups of reference sequences and n groups of comparison sequences from measured data of a water inrush volume to build an original data matrix as follows:

$$[X]=\begin{bmatrix} x_{10} & \cdots & x_{1n} \\ \vdots & \ddots & \vdots \\ x_{m0} & \cdots & x_{mn} \end{bmatrix}$$

where in this matrix, the first column denotes a reference sequence, and the second column denotes a comparison sequence;

A2: as different risk assessment indexes may vary in dimension, and a great analysis and comparison error may exist, it is difficult to draw a correct conclusion, conduct dimensionless processing on original data using an initial value method so as to reduce the analysis error caused by different dimensions, where processed data are as follows:

$$X'=x_{ij}/x_{i1}$$

where i=1, 2 . . . m, j=0, 1 . . . n;

A3: calculating a correlation coefficient as follows:

$$\xi_{ij}=\frac{\min\{|X'_{ij}-X'_{io}|\}+\rho\max\{|X'_{ij}-X'_{io}|\}}{|X'_{ij}-X'_{io}|+\rho\max\{|X'_{ij}-X'_{io}|\}}$$

where $\xi_{ij}$ denotes a correlation coefficient between an ith parameter of a jth comparison sequence and an ith parameter of a reference sequence, $\rho$ denotes an identification coefficient with a value range of [0, 1], a smaller value of the identification coefficient indicates a more significant difference between the correlation coefficients, and according to the actual engineering background and grey theory, setting $\rho$=0.5; and A4: averaging correlation coefficient sequences, and taking an obtained average value as a correlation degree which is expressed as follows:

$$\gamma_{0i}=\frac{1}{n}\sum_{i+1}^{n}\xi_{ij}$$

where $\gamma_{0i}$ denotes a correlation degree, and the closer the $\gamma_{0i}$ is to 1, the higher the correlation degree is;

As shown in FIG. 2, the RBF neural network includes an input layer, a hidden layer and an output layer that are distributed in sequence from left to right, the RBF neural network forms a space of the hidden layer with data of the input layer by using a radial basis function as a mapping relationship, data of the hidden layer is high-dimensional and linearly separable, and is subject to weight adjustment to linearly obtain data of the output layer, and a Gaussian function is adopted as an activation function of the RBF neural network:

$$\varphi(X_m, X_i)=\exp\left(-\frac{1}{2\sigma_i^2}\|X_m-X_i\|^2\right)$$

where $X_i$ denotes a clustering center point, $\|X_m-X_i\|$ denotes a Euclidean distance between a sample point of an input space and the clustering center point, $\sigma_i$ denotes an expansion constant of a radial basis function, and when $$d_i=\max_m\|X_m-X_i\|,$$

the expansion constant is $\sigma_i=d_i/\sqrt{2k}$, in which k is a number of center points;

said improve an algorithm of an RBF neural network using a GRA-based PAM clustering algorithm specifically includes:

B1: determine an original data analysis sequence, and construct an original matrix for dimensionless processing;

B2: calculate a correlation degree r between a comparison sequence and a reference sequence, where the correlation degree r is within a range of 0-1, and the closer it is to 1, the greater the correlation degree is;

B3: determine an input vector X, an actual output vector Y and a target output vector Z of the neural network based on the correlation degree;

B4: determine a number k of clusters, conducting iteration 600 times using a standardized Euclidean distance to determine a clustering center matrix that meets the RBF neural network;

B5: determine a center c of the neural network and an expansion constant $\sigma_i$, initializing a weight vector W, and substitute into a Gaussian function to determine an implicit function output;

B6: train the neural network using a gradient descent method, set an upper limit of an error to 0.005, and an upper limit of iteration times to 10,000, and constantly update the weight vector and standard deviation until convergence; and B7: rate test data using a trained neural network, improve the algorithm of the RBF neural network using GRA-based PAM to train and predict sample data, program a water inrush risk assessment model, and compare assessment data with actual data and prediction data from the traditional RBF neural network and BP neural network, so as to verify the accuracy and reliability of the model.

Through the study of current relevant codes of tunnel construction at home and abroad and the results of risk management for tunnel construction, it is concluded that the main risk factors in a water inrush accident during tunnel construction include geological structure and topography, state of the tunnel and surrounding rock and hydrological conditions. After investigating and analyzing the relevant literature on risks of groundwater inrush, based on the actual geological conditions in Qingdao area, and in combination with various engineering problems encountered in the excavation process of Qingdao Metro, risk indexes of water inrush during tunnel construction with greater influence are determined, and a risk assessment index system for water inrush during construction of Qingdao Metro tunnel based on Qingdao area is built, as shown in Table 1 below:

TABLE 1

Risk assessment index system of water inrush in a constructed subway tunnel

| First-level assessment index | Second-level assessment index | Risk grade<br>⍰ (Low risk) | ⍰ (Medium risk) | ⍰ (High risk) | ⍰ (Super high risk) |
|---|---|---|---|---|---|
| Status $I_1$ of a tunnel and surrounding rock | Excavation width $I_{11}$ of the tunnel | <8.5 | [8.5, 12) | [12-14) | ≥14 |
| | Buried depth $I_{12}$ of the tunnel | <10 | [10-30) | [30-50) | ≥50 |
| | Massiveness $I_{13}$ of rock mass | Complete | Fragmented | Broken | Fully broken |
| | Uniaxial saturated compressive strength $I_{14}$ of rock | >60 | (30-60] | (15-30] | ≤15 |
| | Expansion degree $I_{15}$ of fissures | Undeveloped | Slightly developed | Developed | Fully developed |
| | Basic quality grade $I_{16}$ of rock mass | ⍰,⍰ | ⍰ | ⍰ | ⍰,⍰ |

TABLE 1-continued

Risk assessment index system of water inrush in a constructed subway tunnel

| First-level assessment index | Second-level assessment index | Risk grade | | | |
|---|---|---|---|---|---|
| | | ? (Low risk) | ? (Medium risk) | ? (High risk) | ? (Super high risk) |
| Geological structure and geological factor $I_2$ | Catchment area/% $I_{21}$ | <20 | [20-40) | [40-60) | ≥60 |
| | Landform $I_{22}$ | Flat | Slope | Terrace with a steep slope, and cheuch | Destructional monadnock and peneplain |
| | Compound ratio of soft and hard strata/% $I_{23}$ | <25 | [25-50) | [50-75) | ≥75 |
| Hydrologic condition $I_3$ | Water yield property $I_{31}$ of underground water | Containing no water | Containing little water | Containing slight water | Containing rich water |
| | Difference of elevation $I_{32}$ of underground water | <10 | [10-30) | [30-60) | ≥60 |
| | Permeability coefficient $I_{33}$ | <0.01 | [0.01-1) | [1-10) | ≥10 |
| | Monthly average precipitation $I_{34}$ | <60 | [60-80) | [80-100) | ≥100 |

Embodiment 2

Figure 3:
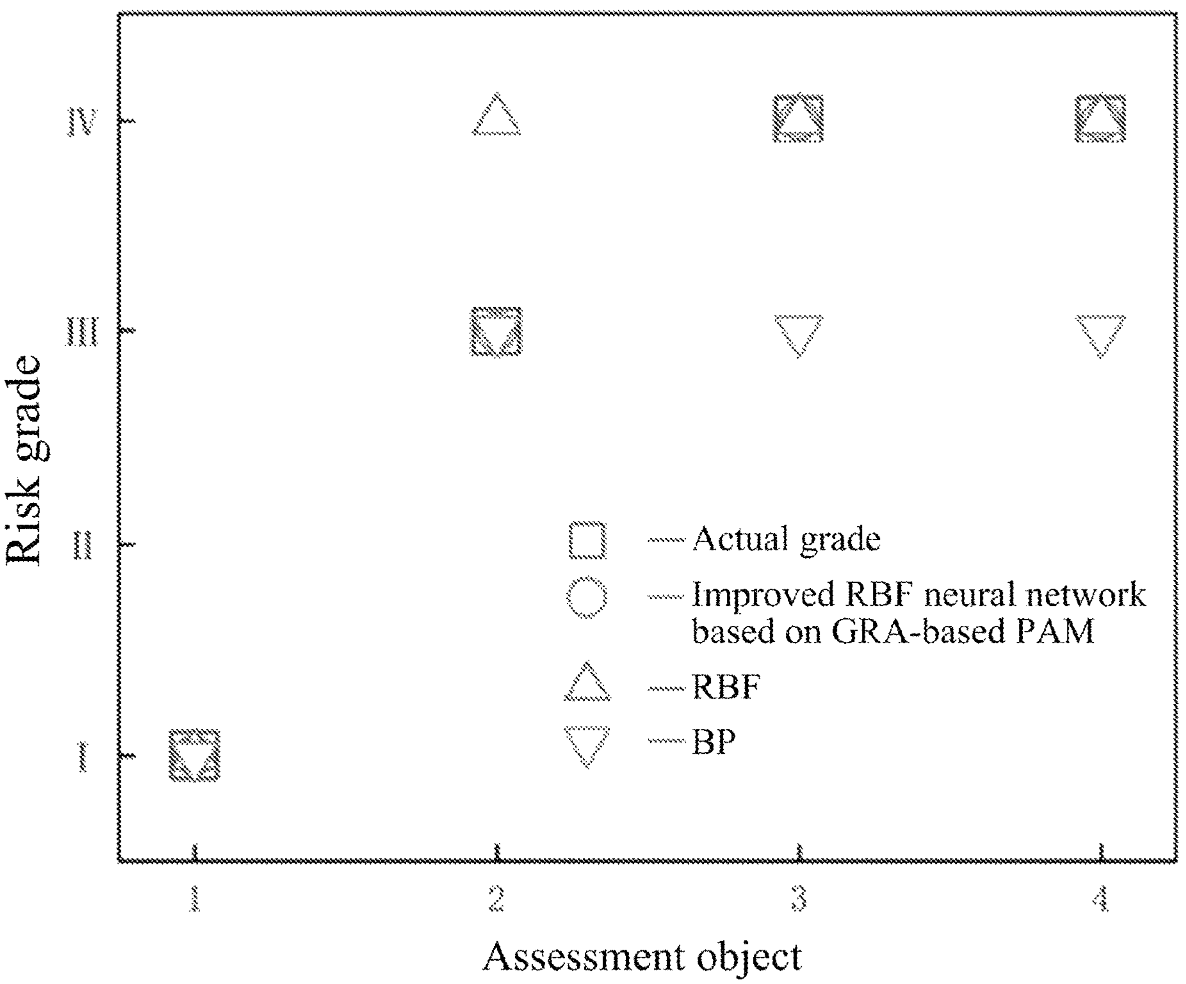
FIG. 3 is a comparison diagram of model prediction results according to Embodiment 2 of the present disclosure.

Referring to FIG. 3, in order to ensure the effectiveness of the water inrush risk assessment model of the improved RBF neural network based on GAR-based PAM, in this embodiment, relevant underground hydrogeological data of Qingdao are consulted, three running tunnels of Qingdao Metro Line 1, Kai-Sheng Section, Qingdao Metro Line 2, Wu-Nan Section, and Qingdao Metro Line 2, Shi-Miao Section are selected, and 12 groups of data of training samples are collected, as shown in Table 2 below. In the meanwhile, according to the geological survey report and data of the construction field of Qingdao Metro Line 4, Jing-Sha Section, four groups of data with varying mileage are selected as data of test samples. After sorting, engineering geological characteristics of varying mileage in Qingdao Metro Line 4, Jing-Sha Section are listed in Table 3, and the data of water inrush risk indexes are shown in Table 4 below.

TABLE 2

Data of training samples

| Name of tunnel | Sample | Grade | $I_{11}$/m | $I_{12}$/m | $I_{13}$ | $I_{14}$/MPa | $I_{15}$ | $I_{16}$ | $I_{21}$/% | $I_{22}$ | $I_{23}$/% | $I_{31}$ | $I_{32}$/m | $I_{33}$/% $md^{-1}$ | $I_{34}$/mm |
|---|---|---|---|---|---|---|---|---|---|---|---|---|---|---|---|
| Qingdao Metro Line 1, Kai-Sheng Section | 1 | I | 6.2 | 12.6 | Complete | 44.23 | Undeveloped | II | 41.35 | Flat | 39.68 | Containing little water | 3.01 | 0.0043 | 59.5 |
| | 2 | II | 6.2 | 12.8 | Fragmented | 44.23 | Slightly developed | IV | 69 | Flat | 84.4 | Containing rich water | 8.84 | 2.8512 | 59.5 |
| | 3 | IV | 6.2 | 14 | Fully broken | 11.97 | Developed | V | 77.21 | Flat | 85.7 | Containing rich water | 12 | 4.4928 | 59.5 |
| | 4 | IV | 6.2 | 13.95 | Fully broken | 10.8 | Fully developed | VI | 75 | Slope | 91 | Containing rich water | 10.47 | 25.92 | 59.5 |
| Qingdao Metro Line 2, Wu-Nan Section | 5 | II | 5.2 | 11.6 | Fragmented | 137.3 | Slightly developed | IV | 11 | Slope | 34.48 | Containing little water | 1.28 | 0.0013 | 57.9 |
| | 6 | IV | 5.2 | 11.5 | Fully broken | 28.2 | Fully developed | V | 28.43 | Slope | 69.56 | Containing slight water | 3.27 | 5.184 | 57.9 |
| | 7 | II | 5.2 | 11 | Broken | 28.2 | Fully developed | V | 0.1 | Flat | 21.8 | Containing no water | 0.1 | 0.0042 | 57.9 |
| | 8 | II | 5.2 | 10.4 | Broken | 137.3 | Slightly developed | V | 31.25 | Flat | 53.84 | Containing little water | 3.25 | 5.184 | 57.9 |
| Qingdao Metro Line 2, Shi-Miao Section | 9 | IV | 6.4 | 13.6 | Fragmented | 15.6 | Developed | VI | 77.43 | Slope | 94.12 | Containing rich water | 9.73 | 15 | 57.9 |
| | 10 | II | 6.4 | 16 | Fragmented | 26 | Slightly developed | V | 74.5 | Flat | 93.75 | Containing rich water | 11.92 | 0.1 | 57.9 |
| | 11 | I | 6.4 | 9.8 | Complete | 57.3 | Undeveloped | IV | 1.63 | Destructional monadnock | 32.65 | Containing little water | 0.16 | 0.01 | 57.9 |

TABLE 2-continued

| Data of training samples | | | | | | | | | | | | | | | | | |
|---|---|---|---|---|---|---|---|---|---|---|---|---|---|---|---|---|---|
| Name | Quantitative index value | | | | | | | | | | | | | | | | |
| of tunnel | Sample | Grade | $I_{11}$/m | $I_{12}$/m | $I_{13}$ | $I_{14}$/MPa | $I_{15}$ | $I_{16}$ | $I_{21}$/% | $I_{22}$ | $I_{23}$/% | $I_{31}$ | $I_{32}$/m | $I_{33}$/% md$^{-1}$ | $I_{34}$/mm |
| | 12 | IV | 6.4 | 15.6 | Fully broken | 6.5 | Fully developed | VI | 84.1 | Flat | 91.76 | Containing rich water | 13.12 | 0.5 | 57.9 |

TABLE 3

| Engineering geological characteristics of varying mileage | | |
|---|---|---|
| No. | Tunnel section | Engineering geological characteristics of each tunnel section |
| 1 | ZDK25 + 111.120-ZDK25 + 137.800 | This section is 26.68 m long, with undeveloped joint fissures. Surrounding rock is classified mainly at grade II. The tunneling condition is good, and groundwater is less developed |
| 2 | ZDK25 + 137.800-ZDK25 + 296.800 | This section is 159.0 m long, with developed joint fissures. Surrounding rock is classified mainly at grade IV. The tunneling condition is not bad, and groundwater is slightly developed |
| 3 | ZDK25 + 296.800-ZDK25 + 402.130 | This section is 105.33 m long and is a fault fracture zone with fully developed joint fissures. The surrounding rock is classified mainly at grade V and grade VI, The rock mass exhibits a loose structure. The tunneling condition is poor, and there is abundant groundwater |
| 4 | ZDK25 + 528.000-ZDK25 + 879.000 | This section is 351.0 m long, with developed joint fissures. Surrounding rock is classified mainly at grade VI. The tunneling condition is poor, and groundwater is slightly developed |

TABLE 4

| Data of risk assessment indexes for water inrush | | | | | | | | | | | | | |
|---|---|---|---|---|---|---|---|---|---|---|---|---|---|
| Sample | Quantitative index value | | | | | | | | | | | | |
| | $I_{11}$/m | $I_{12}$/m | $I_{13}$ | $I_{14}$/MPa | $I_{15}$ | $I_{16}$ | $I_{21}$/% | $I_{22}$ | $I_{23}$/% | $I_{31}$ | $I_{32}$/m | $I_{33}$/md$^{-1}$ | $I_{34}$/mm |
| 1 | 7.4 | 16.2 | Complete | 93.22 | Undeveloped | II | 21.6 | Flat | 16.2 | Containing slight water | 1.4 | 0.0026 | 118.6 |
| 2 | 7.4 | 17.74 | Broken | 45.3 | Developed | IV | 77.2 | Flat | 87.4 | Containing rich water | 15.94 | 0.5184 | 118.6 |
| 3 | 7.4 | 19 | Broken | 45.3 | Fully developed | V | 74.2 | Destructional monadnock | 80 | Containing rich water | 17.9 | 0.5184 | 118.6 |
| 4 | 7.4 | 16.6 | Broken | 45.3 | Developed | VI | 95.6 | Flat | 98 | Containing rich water | 15.88 | 0.5184 | 118.6 |

Conduct GRA on the training data, take the risk grade as a reference sequence and a quantitative index value as a comparison sequence, and compile a GRA program by using MATLAB. After dimensionless processing, calculate GRA correlation coefficients between parameters of the reference sequence and the comparison sequence, which are shown in Table 5 below.

TABLE 5

| GRA correlation coefficient | | | | | | | | | | | | | |
|---|---|---|---|---|---|---|---|---|---|---|---|---|---|
| Sample | Correlation coefficient | | | | | | | | | | | | |
| | $I_{11}$ | $I_{12}$ | $I_{13}$ | $I_{14}$ | $I_{15}$ | $I_{16}$ | $I_{21}$ | $I_{22}$ | $I_{23}$ | $I_{31}$ | $I_{32}$ | $I_{33}$ | $I_{34}$ |
| 1 | 0.7358 | 0.7521 | 0.9940 | 0.7581 | 1.0000 | 0.9606 | 0.7897 | 0.8763 | 0.8890 | 0 8623 | 0.9478 | 0.8395 | 0.7435 |
| 2 | 0.8566 | 0.8724 | 0.9882 | 0.8869 | 1.0000 | 0.9359 | 0.7241 | 0.9520 | 0.7752 | 0.7579 | 0.7455 | 0.9268 | 0.8670 |
| 3 | 0.8225 | 0.8422 | 0.9766 | 0.6141 | 0.8392 | 0.8589 | 0.9186 | 0.6975 | 0.9235 | 0.9400 | 0.8216 | 0.7770 | 0.8131 |
| 4 | 0.8225 | 0.8408 | 0.9766 | 0.6091 | 1.0000 | 0.8589 | 0.9398 | 0.9084 | 0.9610 | 0.9400 | 0.9160 | 0.3333 | 0.8131 |

TABLE 5-continued

| GRA correlation coefficient | | | | | | | | | | | | | |
|---|---|---|---|---|---|---|---|---|---|---|---|---|---|
| Sam- | Correlation coefficient | | | | | | | | | | | | |
| ple | $I_{11}$ | $I_{12}$ | $I_{13}$ | $I_{14}$ | $I_{15}$ | $I_{16}$ | $I_{21}$ | $I_{22}$ | $I_{23}$ | $I_{31}$ | $I_{32}$ | $I_{33}$ | $I_{34}$ |
| 5 | 0.9271 | 0.9119 | 0.9882 | 0.4541 | 0.8392 | 0.9359 | 0.7927 | 0.7798 | 0.9024 | 0.9690 | 0.7823 | 0.7230 | 0.8780 |
| 6 | 0.7665 | 0.7747 | 0.9766 | 0.6940 | 1.0000 | 0.8589 | 0.6889 | 0.9084 | 0.8253 | 0.8067 | 0.6673 | 0.8242 | 0.8036 |
| 7 | 0.9271 | 0.9330 | 0.8267 | 0.9455 | 0.7229 | 0.8203 | 0.7235 | 0.9520 | 0.8269 | 0.8281 | 0.7272 | 0.7231 | 0.8780 |
| 8 | 0.9271 | 0.9551 | 0.8267 | 0.4541 | 1.0000 | 0.8203 | 0.9642 | 0.9520 | 0.9558 | 0.9690 | 0.8954 | 0.8547 | 0.8780 |
| 9 | 0.8347 | 0.8307 | 0.7292 | 0.6303 | 0.8392 | 0.8589 | 0.9166 | 0.9084 | 0.9845 | 0.9400 | 0.9699 | 0.5451 | 0.8036 |
| 10 | 0.9936 | 0.9199 | 0.8477 | 0.7845 | 0.8392 | 0.9734 | 0.7999 | 0.805) | 0.8525 | 0.8867 | 0.7132 | 0.6393 | 0.9499 |
| 11 | 0.7263 | 0.8238 | 0.9940 | 0.6802 | 1.0000 | 0.7936 | 0.8521 | 0.4673 | 0.9356 | 0.8623 | 0.8485 | 0.8399 | 0.7516 |
| 12 | 0.8347 | 0.8920 | 0.9766 | 0.5912 | 1.0000 | 0.8589 | 0.8584 | 0.6975 | 0 9666 | 0.9400 | 0.7640 | 0.5837 | 0.8036 |

Average correlation coefficient sequences to obtain a correlation degree of each parameter as shown in Table 6.

TABLE 6

| Quantitative index value and correlation degree | | | | | | | | | | | | | |
|---|---|---|---|---|---|---|---|---|---|---|---|---|---|
| Quantitative index value | $I_{11}$ | $I_{12}$ | $I_{13}$ | $I_{14}$ | $I_{15}$ | $I_{16}$ | $I_{21}$ | $I_{22}$ | $I_{23}$ | $I_{31}$ | $I_{32}$ | $I_{33}$ | $I_{34}$ |
| Correlation degree | 0.848 | 0.862 | 0.925 | 0.675 | 0.923 | 0.878 | 0.831 | 0.825 | 0.900 | 0.892 | 0.817 | 0.718 | 0.832 |

Rank quantitative index values by the correlation degree, take top 12 quantitative index values with greater correlation degree as sample input values, take 12 groups of sample data as a training sample input, and use I, II, III and IV to represent risk grades (low risk, medium risk, high risk and super high risk) of water inrush occurring actually in subway construction. In order to ensure the accuracy of a model, set an optimal number k of clusters to 4, set a maximum number of iterations to 600 when a PAM clustering center is selected, train an improved RBF neural network using a gradient descent method, set err-goal to 0.005, set a maximum number of iterations to 10,000, set a total program runtime to 14.43 s, and when a training prediction result Testout is completely consistent with a training sample Samout upon comparison (see Table 7 for detailed comparison), it indicates that the model meets the training requirements.

TABLE 7

| Comparison of prediction results and training samples | | | | | | | | | | | | |
|---|---|---|---|---|---|---|---|---|---|---|---|---|
| Sample | Risk grade | | | | | | | | | | | |
| Testout | 1 | 2 | 4 | 4 | 2 | 4 | 2 | 2 | 4 | 3 | 1 | 4 |
| Samout | I | II | III | IV | II | IV | II | II | IV | III | I | IV |

Assess risk grades of water inrush for four groups of test samples selected from Qingdao Metro Line 4, Jing-Sha Section by the improved RBF neural network based on GAR-based PAM, and assess risk grades of water inrush for the same data by traditional RBF neural network and BP neural network. The analysis process of the two neural networks for facilitating comparisons is not described herein. The assessment results are shown in Table 8, and the comparison of prediction results is shown in FIG. 3.

TABLE 8

| Assessment results on risk grades of water inrush in tunnel construction by the improved RBF neural network based on GAR-based PAM | | | | |
|---|---|---|---|---|
| | | Model prediction | | |
| Qingdao Metro Line 4, Jing-Sha Tunnel Section | Actual grade | Improved RBF neural network based on GAR-based PAM | RBF | BP |
| ZDK25 + 111.120-ZDK25 + 137.800 | I | I | I | I |
| ZDK25 + 137.800-ZDK25 + 296.800 | III | III | IV | III |
| ZDK25 + 296.800-ZDK25 + 402.130 | IV | IV | IV | III |
| ZDK25 + 528.000-ZDK25 + 879.000 | IV | IV | IV | III |
| Mean square error | | 0.0461 | 0.2500 | 0.7787 |

As can be seen from Table 8 and FIG. 3, the risk grade of water inrush in Qingdao Metro Line 4, Jing-Sha Section predicted by this embodiment is completely consistent with the actual assessment risk grade. The water inrush in the Jing-Sha Section (ZDK25+296.800-ZDK25+402.130) is at a risk grade of IV, which represents a super high risk. On May 24, 2019, a large-scale water inrush accident occurred at ZDK25+343, resulting in serious human and property losses. The accident verifies the application of the improved RBF neural network based on GAR-based PAM in the risk assessment of water inrush.

In addition, compared with the traditional RBF neural network model and the BP neural network model, the model in the present disclosure has higher prediction accuracy, better performance, smaller mean square error and is less liable to fall into the local optimal solution, indicating that the improved RBF neural network based on GAR-based PAM can better fit the complex relationship between the risk grade of water inrush and various factors. Besides, by conducting risk grade assessment in advance, staff can carry out safety protection ahead of time, so as to effectively reduce the construction risk of water inrush and prevent the occurrence of disasters.

The above described are merely preferred embodiments of the present disclosure, and not intended to limit the present disclosure. Any modifications, equivalent replacements and improvements made within the spirit and principle of the present disclosure should all fall within the scope of protection of the present disclosure.

What is claimed is:

1. A risk assessment method of water inrush in tunnels constructed in water-rich grounds, comprising the following steps:

step 1: first, simulating a tunnel excavation process by finite element software and fluid-structure interaction, building a three-dimensional model of tunnel construction according to field construction data, then analyzing precursory information and stress-displacement response of a water inrush accident occurring in subway tunnel construction according to the three-dimensional model of tunnel construction, and determining causes of the water inrush accident occurring in a fracture zone of a water-rich ground according to analysis results;

step 2: according to a research method of control variables, creating a tunnel construction model under different working conditions by the finite element software, qualitatively and quantitatively analyzing effects of factors of a groundwater level, an elastic modulus of a fracture zone and advanced pipe shed grouting on the stability of surrounding rock, and summarizing change rules of deformation and seepage of the surrounding rock under different working conditions; and step 3: based on the field construction data, acquiring physical and mechanical indexes of soil and rock of a complex stratum in an offshore area and engineering characteristics under a condition of rich water, summarizing water yield properties of various kinds of complex strata, improving an algorithm of a radial basis function (RBF) neural network using a Grey Relation Analysis (GRA)-based Partitioning Around Medoid (PAM) clustering algorithm to assess risks of collapse and water inrush occurring in the stratum, building a water yield property assessment model according to the causes of the water inrush accident and the change rules of deformation and seepage of the surrounding rock under different working conditions, extracting a training sample and a test sample from actual tunnel engineering, training the built neural network model, and assessing the risks of water inrush in tunnel construction.

2. The risk assessment method of water inrush in tunnels constructed in water-rich grounds according to claim 1, wherein said building a three-dimensional model in step 1 specifically comprises: on the basis of the finite element software, and in combination with fluid-structure interaction, analyzing a water inrush accident occurring in an offshore water-rich area to be assessed to obtain a mechanism of a water inrush accident during tunnel construction in a complex stratum of an offshore area, and analyzing an evolution process of a water inrush accident from the aspects of hydroengineering geology, displacement fields, stress fields and seepage fields.

3. The risk assessment method of water inrush in tunnels constructed in water-rich grounds according to claim 1, wherein said GRA in step 3 specifically comprises:

A1: defining a risk assessment grade as a reference sequence that reflects characteristics of a system, and a risk assessment index as a comparison sequence that affects the system, and analyzing m groups of reference sequences and n groups of comparison sequences from measured data of a water inrush volume to build an original data matrix as follows:

$$[X] = \begin{bmatrix} x_{10} & \cdots & x_{1n} \\ \vdots & \ddots & \vdots \\ x_{m0} & \cdots & x_{mn} \end{bmatrix}$$

wherein in this matrix, the first column denotes a reference sequence, and the second column denotes a comparison sequence;

A2: conducting dimensionless processing on original data using an initial value method, wherein processed data are as follows:

$$X' = x_{ij}/x_{i1}$$

wherein i=1, 2 . . . m, j=0, 1 . . . n;

A3: calculating a correlation coefficient as follows:

$$\xi_{ij} = \frac{\min\{|X'_{ij} - X'_{io}|\} + \rho\max\{|X'_{ij} - X'_{io}|\}}{|X'_{ij} - X'_{io}| + \rho\max\{|X'_{ij} - X'_{io}|\}}$$

wherein $\xi_{ij}$ denotes a correlation coefficient between an ith parameter of a jth comparison sequence and an ith parameter of a reference sequence, ρ denotes an identification coefficient with a value range of [0, 1], a smaller value of the identification coefficient indicates a more significant difference between the correlation coefficients, and according to the actual engineering background and grey theory, setting ρ=0.5; and A4: averaging correlation coefficient sequences, and taking an obtained average value as a correlation degree which is expressed as follows:

$$\gamma_{0i} = \frac{1}{n}\sum_{i+1}^{n}\xi_{ij}$$

wherein $\gamma_{0i}$ denotes a correlation degree, and the closer the $\gamma_{0i}$ is to 1, the higher the correlation degree is.

4. The risk assessment method of water inrush in tunnels constructed in water-rich grounds according to claim 1, wherein in step 3, the RBF neural network comprises an input layer, a hidden layer and an output layer, the RBF neural network forms a space of the hidden layer with data of the input layer by using a radial basis function as a mapping relationship, and data of the hidden layer is high-dimensional and linearly separable, and is subject to weight adjustment to linearly obtain data of the output layer.

5. The risk assessment method of water inrush in tunnels constructed in water-rich grounds according to claim 1, wherein in step 3, a Gaussian function is adopted as an activation function of the RBF neural network:

$$\varphi(X_m, X_i) = \exp\left(-\frac{1}{2\sigma_i^2}\|X_m - X_i\|^2\right)$$

wherein $X_i$ denotes a clustering center point, $\|X_m - X_i\|$ denotes a Euclidean distance between a sample point of an input space and the clustering center point, $\sigma_i$ denotes an expansion constant of a radial basis function, and when $$d_i = \max_m \|X_m - X_i\|,$$

the expansion constant is $\sigma_i = d_i/\sqrt{2k}$, in which k is a number of center points.

6. The risk assessment method of water inrush in tunnels constructed in water-rich grounds according to claim 1, wherein said improving an algorithm of an RBF neural network using a GRA-based PAM clustering algorithm in step 3 specifically comprises:

B1: determining an original data analysis sequence, and constructing an original matrix for dimensionless processing;

B2: calculating a correlation degree r between a comparison sequence and a reference sequence;

B3: determining an input vector X, an actual output vector Y and a target output vector Z of the neural network based on the correlation degree;

B4: determining a number k of clusters, conducting iteration 600 times using a standardized Euclidean distance to determine a clustering center matrix that meets the RBF neural network;

B5: determining a center c of the neural network and an expansion constant $\sigma_i$, initializing a weight vector W, and substituting into a Gaussian function to determine an implicit function output;

B6: training the neural network using a gradient descent method, setting an upper limit of an error to 0.005, and an upper limit of iteration times to 10,000, and constantly updating the weight vector and standard deviation until convergence; and B7: rating test data using a trained neural network, and comparing a prediction result with the RBF neural network and a back propagation (BP) neural network.

7. The risk assessment method of water inrush in tunnels constructed in water-rich grounds according to claim 6, wherein in B2, the correlation degree r between the comparison sequence and the reference sequence is within a range of 0-1, and the closer it is to 1, the greater the correlation degree is.

8. The risk assessment method of water inrush in tunnels constructed in water-rich grounds according to claim 6, wherein in B7, the algorithm of the RBF neural network is improved using GRA-based PAM to train and predict sample data, a water inrush risk assessment model is programmed, assessment data is compared with actual data and prediction data from the traditional RBF neural network and BP neural network, so as to verify the accuracy and reliability of the model.

* * * * *